(12) United States Patent
Clavenna et al.

(10) Patent No.: US 10,700,985 B2
(45) Date of Patent: Jun. 30, 2020

(54) APPARATUS AND METHOD FOR TRAFFIC MANAGEMENT IN A TELECOMMUNICATIONS NETWORK

(71) Applicant: ITALTEL S.P.A., Settimo Milanese (IT)

(72) Inventors: Antonella Clavenna, Rho (IT); Stefano Boero, Como (IT)

(73) Assignee: Italtel S.P.A., Settimo Milanese (MI) (IT)

( * ) Notice: Subject to any disclaimer, the term of this patent is extended or adjusted under 35 U.S.C. 154(b) by 0 days.

(21) Appl. No.: 16/017,809

(22) Filed: Jun. 25, 2018

(65) Prior Publication Data

US 2018/0375778 A1 Dec. 27, 2018

(30) Foreign Application Priority Data

Jun. 26, 2017 (IT) .......................... 102017000071059

(51) Int. Cl.
*H04L 12/859* (2013.01)
*H04L 12/24* (2006.01)
*H04L 12/26* (2006.01)

(52) U.S. Cl.
CPC ...... *H04L 47/2475* (2013.01); *H04L 41/0823* (2013.01); *H04L 41/5025* (2013.01); *H04L 41/12* (2013.01); *H04L 41/145* (2013.01); *H04L 43/08* (2013.01)

(58) Field of Classification Search
CPC ............. H04L 47/2475; H04L 41/0823; H04L 41/5025; H04L 41/145; H04L 43/08; H04L 41/12
See application file for complete search history.

(56) References Cited

U.S. PATENT DOCUMENTS

2008/0225709 A1* 9/2008 Lange ................... H04L 45/302
370/230
2016/0212648 A1* 7/2016 Xu ......................... H04W 24/08

* cited by examiner

*Primary Examiner* — Dady Chery
(74) *Attorney, Agent, or Firm* — Workman Nydegger

(57) ABSTRACT

An apparatus for traffic management in a telecommunications network, wherein, through said telecommunications network (TLC), data are exchanged by means of at least one software application, includes: a first module configured for acquiring first traffic information (INFO1), at application level, relating to the data traffic exchanged through the at least one application; a second module configured for acquiring second traffic information (INFO2), at network level, relating to the data traffic exchanged through said telecommunications network (TLC); a control module configured for generating output signals (OUT) for managing resources of said telecommunications network (TLC) for the data traffic as a function of said first information (INFO1) and said second information (INFO2).

9 Claims, 2 Drawing Sheets

APPARATUS AND METHOD FOR TRAFFIC MANAGEMENT IN A TELECOMMUNICATIONS NETWORK

CROSS REFERENCE TO RELATED APPLICATION

The present application claims priority to Italian Application No. 1102017000071059, filed Jun. 26, 2017 which is incorporated herein by specific reference.

DESCRIPTION

Technical Field

The present invention relates to an apparatus and a method for traffic management in a telecommunications network.

In particular, the invention applies to geographically distributed Unified Communication and Collaboration (UC&C) solutions, wherein different locations of one structure or enterprise are interconnected via connectivity provided by a Service Provider (SP).

Prior Art

As is known, UC&C systems are becoming increasingly widespread. More and more often, different UC&C applications coexist within enterprises and share the same network resources.

Note that, in the present context, "enterprise" refers to an organized structure, such as, for example, a concern or a company, using telematic tools for interconnecting various users and various locations belonging thereto.

UC&C solutions typically involve multiple communication tools (e.g., voice, video, instant messaging, web conferencing, etc.). In particular, video-based communication tools are often crucial for business development and for the success of a company's strategy, especially for geographically distributed companies.

All communication tools use the same IP network infrastructure, although each one of them, in order to guarantee an adequate Quality of Experience (QoE) to the user, has specific requirements in terms of IP traffic parameters (required bandwidth, transmission characteristics such as delay, packet loss, jitter, etc.).

The traditional technologies used for ensuring good perceived quality (QoE) to the applications employed, in particular real-time applications, at network infrastructure level, deal with Quality of Service (QoS) management. In particular, IP traffic is assigned different priority levels, while traffic engineering policies are implemented. At application level (i.e., the level of UC&C systems), on the other hand, Call Admission Control (CAC) policies are implemented along with other policies. Each technology acts independently and without using any information about the others.

The methods known at present are applied in a static manner, independently of the actual IP traffic conditions and of the actual business requirements, separately on the two network and application layers, and individually by each call control of each UC&C technology. Each method is implemented in a non-correlated, non-synergic manner, without taking into account, both dynamically and adaptively, either the actual state of the network resources or the actual business requirements at any given time.

The possibility, used until now, of marking and identifying real-time traffic according to the device that is generating it turns out to be ineffective within the frame of UC&C, because each terminal can generate both real-time traffic and non-real-time traffic.

Furthermore, since the bandwidth used by the applications can vary considerably and dynamically, as a function of the modes of communication employed instant by instant and also, in particular for video, within the same communication, it becomes difficult to statically define a priori an optimal subdivision and management of the network resources, which could prevent any congestion episodes from occurring, resulting in packet loss and consequent QoE degradation for potentially all ongoing communications.

OBJECTS AND SUMMARY OF THE INVENTION

It is one object of the present invention to provide dynamic and centralized control over the network+applications system, which is consistent with the actual and punctual requirements of the applications and with the company's business requirements, while ensuring resource utilization optimization and preserving the perceived QoE for every communication service.

This and other objects are substantially achieved through an apparatus and a method for traffic management in a telecommunications network as described in the appended claims.

BRIEF DESCRIPTION OF THE DRAWINGS

Further features and advantages will become more apparent from the following detailed description of some preferred but non-limiting embodiments of the invention.

This description will refer to the annexed drawings, which are also provided merely as explanatory and non-limiting examples, wherein.

DETAILED DESCRIPTION OF THE INVENTION

In accordance with the annexed drawings, 1 designates as a whole an apparatus for traffic management in a telecommunications network according to the present invention.

Figure 1:
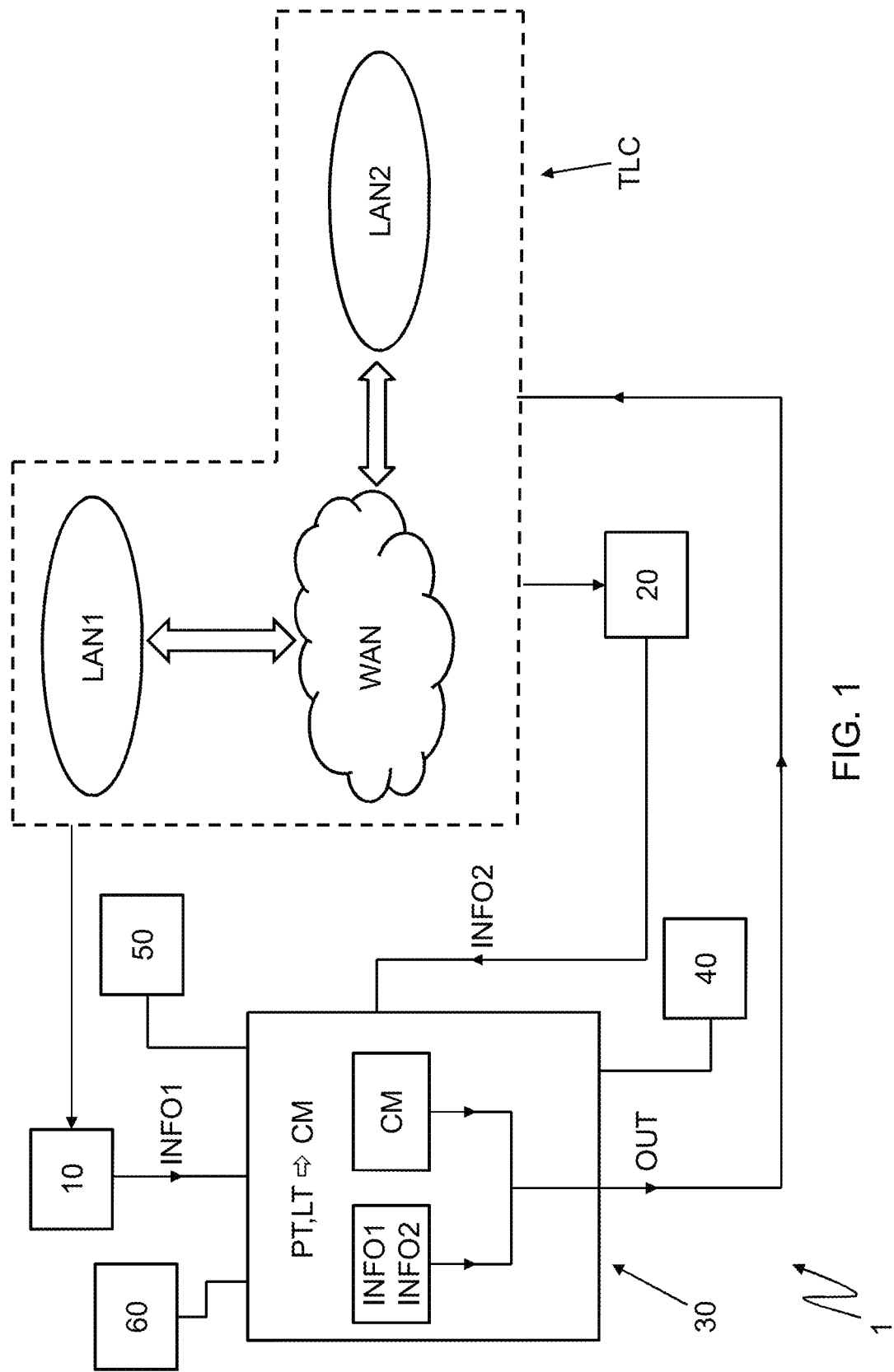
FIG. 1 shows a block diagram representative of the invention.

The apparatus 1 (FIG. 1) is advantageously used for managing a telecommunications network TLC that comprises, for example, at least one local network LAN1, LAN2 and one external network WAN.

There may be multiple local networks LAN1, LAN2, connected to each other through the external network WAN.

By way of example, the local networks LAN1, LAN2 are located at geographically separate points, as distinct locations of the same enterprise.

The external network WAN can be managed by a Service Provider, which provides the enterprise with connectivity between the different locations.

Each location, i.e., each local network LAN1, LAN2, is equipped with one or more communication software applications, such as, for example, Cisco Unified Communications Manager, Skype for Business/Lync, etc.).

Preferably, TCP/IP technology is used for exchanging data through the telecommunications network TLC.

The apparatus 1 is equipped with a control module 30 configured for managing the applications and the traffic in the network TLC on the basis of information that allows preserving the QoE for the users of the various services provided.

In particular, the control module 30 is configured for jointly considering both network level information and application level information, so as to manage the available resources and the applications with mutual awareness; management can be related dynamically to the actual (i.e., punctual, at a given time) business requirements of the enterprise, abstractly represented by specific "service logics" that can be activated dynamically.

In particular, network resources and applications are managed by the control module 30 through the generation of suitable output signals OUT, intended for the various components of the network, for implementing determined traffic management policies.

Preferably, the control module 30 determines a physical topology PT of the telecommunications network TLC. In particular, the control module 30 carries out a mapping of the various network apparatuses belonging to at least the local networks LAN1, LAN2. In practice, an abstract model of the physical topology PT of the network TLC is acquired, wherein each apparatus is characterized by its own function (e.g., host, access router, distribution switch, core switch/hub, border router, etc.).

Preferably, the telecommunications network TLC is managed via Software Defined Network or SDN technology.

Preferably, the control module 30 identifies those apparatuses which, at network level, provide connectivity towards the external network WAN. In practical terms, those devices are selected which provide the connections for which band availability with guaranteed QoS is negotiated with the Service Provider based on specific Service Level Agreements (SLA) and is subject to monitoring/checking.

Advantageously, the physical topology PT is defined on the basis of information supplied by an SDN controller associated with the telecommunications network TLC.

Preferably, the control module 30 determines a logical topology LT of the software application(s) employed for communicating through the network TLC, i.e., a logical topology of the enterprise wherein, through the local networks LAN1, LAN2 and the external network WAN, the various users are put in communication with one another.

Preferably, though not necessarily, two or more communication applications are used. The above-mentioned logical topology LT is then determined by considering all the applications employed.

In order to define the logical topology LT, the control module 30 first analyses the topological model of the enterprise, specific for each UC&C application, as defined for the Call Admission Control (CAC) functionality. In particular, the control module 30 identifies the characteristic elements used for representing, at the logical service level, the resources that are subject to application of the CAC functionality by the Call Control of the UC&C (e.g., link, location, site, region, CAC limits, etc.).

The control module 30 then acquires the logical topology LT of the enterprise, i.e., the topology configured for the purpose of applying the CAC functionality in accordance with the specific model required by the respective UC&C technology. Topology acquisition occurs for each UC&C technology that is present.

The control module 30 is also configured for generating a correlation model CM, based on said physical topology PT and logical topology LT.

The correlation model CM is employed for jointly managing the UC&C applications and the network resources as regards the traffic on the telecommunications network TLC and all its characteristic parameters, and as a function of the active service logics ("enterprise business policy").

The logical topology LT and the physical topology PT can be expressed by means of respective graphs, which represent all the possible paths existing between each pair of nodes of the graph itself. The graphs can be weighted.

Once the actual paths that are present in each one of the two graphs have been identified, the control module 30 associates the elements of each one of the two graphs with the elements of the correlation model CM previously generated.

The Applicant points out that it is possible, by means of a graph, to model numerous situations. In particular, the logical topology LT of the enterprise can be defined by means of a graph for the purpose of applying the Call Admission Control logics.

Said graph may be weighted, in particular whenever there are two or more possible paths between two nodes.

Figure 2:
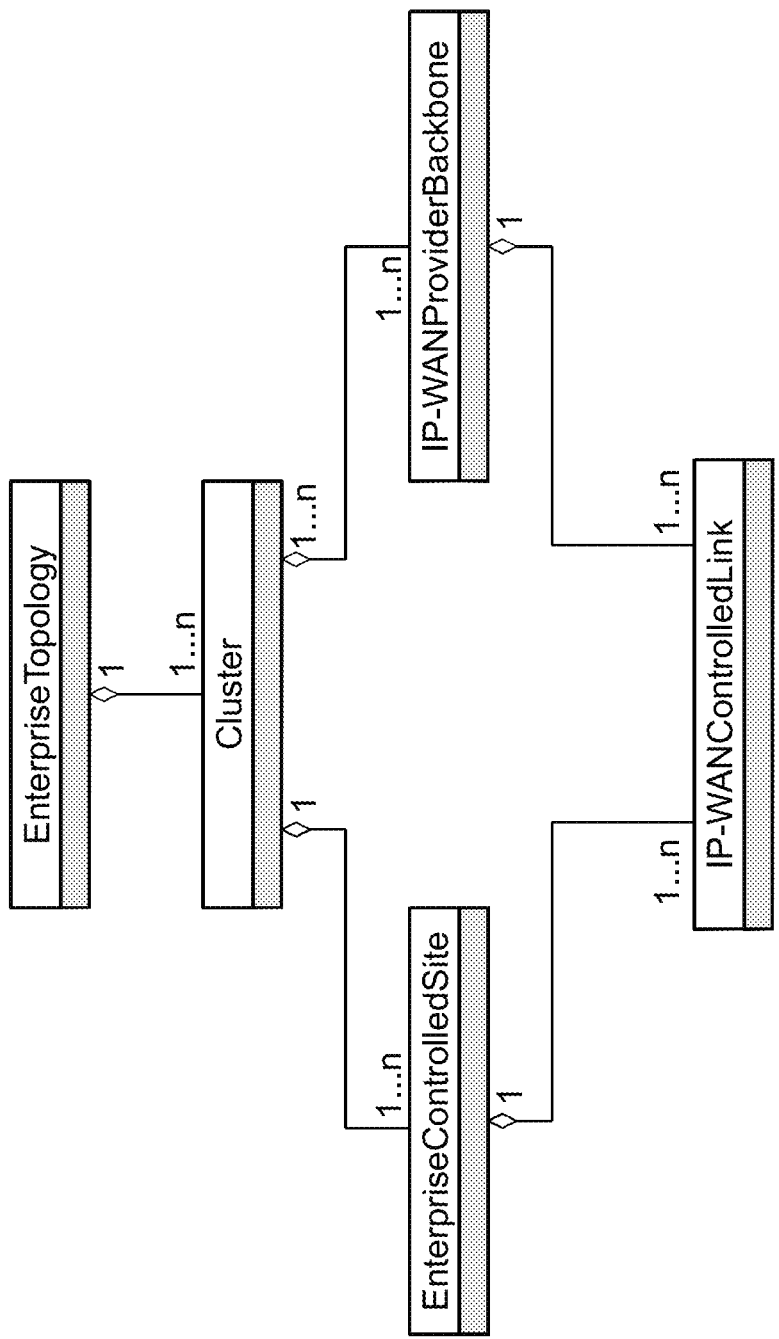
FIG. 2 shows a data structure employed within the frame of the invention.

FIG. 2 shows an example of one possible correlation model CM obtained in accordance with the present invention.

The "EnterpriseControlledSite" block represents the objects of the "CUCM Location", "MS network site", etc. type.

The "WANProviderBackbone" block represents the external network WAN.

The "WANControlledLink" block represents the objects of the "CUCMLink" type and, with reference to Skype for Business, the NetworkSite/NetworkRegion connectivity relationship (implicit IP-WAN Link), the "MS region link" element (explicit IP-WAN Link modelling the direct connectivity between two network regions), the "MS inter-site link" element (explicit IP-WAN Link modelling the direct connectivity between two network sites), etc.

As aforesaid, the correlation model CM is advantageously employed, within the frame of the invention, for joint management of UC&C applications and network resources oriented towards said data exchange, taking into consideration the active "enterprise business policies".

In particular, the control module 30 is configured for carrying out, among other functions, the Call Admission Control Adapter function: based on the information available through the correlation model CM, the control module 30 can dynamically change the parameters associated with the Call Admission Control (CAC) for each one of the UC&C systems being managed and present at application level (service layer). This allows for an appropriate implementation of CAC policies, according to specific control logics that may be configured from time to time, in order to optimize the utilization of the network resources, compatibly with the active "enterprise business policies", while at the same time preserving the QoE of the sessions identified as "business relevant".

The control logics can be configured and implemented both in relation to the actual condition of the IP traffic parameters correlated at network level (e.g., real-time measurements of the available bandwidth for each specific traffic class, transmission characteristics such as delay, packet loss, jitter, and other available network quantities/events) and in relation to other application logics, i.e., "enterprise business policies", which can be configured according to specific requirements of the enterprise at any given time.

In particular, the apparatus 1 comprises a first module 10 configured for acquiring first traffic information INFO1, at application level, relating to the data traffic exchanged through said application(s) being used in the enterprise. By way of example, the information considered may include the data exchange type (video, audio, messaging, etc.), the priority level assigned to the session, the instant at which a session is expected to start (scheduled date/time), etc.

The apparatus 1 further comprises a second module 20 configured for acquiring second traffic information INFO2, at network level, relating to the data traffic exchanged through the telecommunications network TLC. By way of example, the information considered may include, as aforesaid, real-time measurements of the available bandwidth for each specific traffic class, transmission characteristics such as delay, packet loss, jitter, etc.

The control module 30 is interfaced with the first and second modules 10, 20, so as to receive therefrom the acquired information and implement suitable management policies correlated with the applications and the network resources.

Note that the apparatus 1, and in particular the first module 10, the second module 20 and the control module 30, do not belong to the telecommunications network TLC. The telecommunications network TLC can operate in standard mode and provide, as far as possible, the services requested by the various apparatuses/users even without the apparatus 1. The apparatus 1 and the modules that constitute it do not deal with the content of the signals being sent to the applications and/or to the network apparatuses. The apparatus 1 communicates with the controllers or control apparatuses that are already present in the telecommunications network TLC, adjusting their decision-making policies on the basis of the criteria and considerations described herein, in particular combining information coming from the network layer and information coming from the application layer.

By way of example, the following scenarios can be considered, wherein it is possible to tangibly appreciate the usefulness of the operations carried out by the control module 30.

1. If one or more UC&C technologies are present in the enterprise, and the network infrastructure has a certain connectivity towards the external network WAN (i.e., a given band availability), the control module 30 is configured for automatically detecting and signalling a configuration of the CAC parameters that is inconsistent with the correlated network resources.

2. If the enterprise includes two or more UC&C technologies using the same network infrastructure (i.e., said telecommunications network TLC), the control module 30 is configured for dynamically modifying the respective CAC parameters for each service in relation to the specific "enterprise business policy" that may be active at any given time and as a function of the following variables correlated with one another:
   A. percentage of actual utilization of the specific service compared to the other binding services in the same traffic class;
   B. actual band availability in the traffic class being used on the network.

3. If one or more UC&C technologies are present in the enterprise, and the network infrastructure has redundant connectivity towards the external network WAN (i.e., presence of two links in active/standby mode with different capacity), the control module 30 will provide, upon reception of the event signalling a fault in the primary link and the use of the secondary back-up link, for automatically adapting the CAC parameters proportionally to the reduced band availability of the connection towards the external network WAN, while at the same time taking into account any specific "enterprise business policy" that may be active at that specific instant.

4. If one or more UC&C technologies are present in the enterprise, at least one of which is equipped with an interface with a scheduling system for reception of a notification indicating the start date and time of a priority video session, the control module 30 can automatically adapt the CAC parameters for the other binding services in the same traffic class, taking into account any specific "enterprise business policy" that may be active at that specific instant. Through the interface to a "QoS Adapter" module, the control module 30 may optionally apply suitable IP traffic classification policies ("per-flow marking") to the data stream associated with the priority session.

In one embodiment, the apparatus 1 further comprises a monitoring module 40, which allows displaying the information correlated between the physical network layer and the logical application layer, both in real time and a posteriori, for time intervals useful for statistical purposes.

In one embodiment, the apparatus 1 further comprises a setup module 50 that allows the definition of optimization policies representing specific use cases of interest for the company (referred to as "enterprise business policy").

In one embodiment, the apparatus 1 further comprises a management module 60 configured for governing, in co-operation with the SDN controller, the application of suitable traffic classification policies as a function of specific business needs.

Preferably, the above-mentioned output signals are generated by the control module 30 also in co-operation with the setup module 50 and/or the management module 60.

Note that the above-mentioned modules 10, 20, 30, 40, 50, 60 comprise the hardware/software components that are necessary for the execution of the operations described and claimed herein.

In particular, the method of the present invention can be implemented by means of software that, when run by one or more processors, will result in the execution of the steps described and claimed herein. Such software may be stored in a non-volatile memory associated with said one or more processors. The apparatus 1 is therefore equipped with one or more processors configured, by means of suitable software, for executing the above-described steps. The apparatus 1 preferably comprises also one or more memories for storing the data and parameters necessary for the operation of said one or more processors in accordance with the present description.

The invention achieves important advantages.

First of all, the invention provides dynamic and centralized control over the network+applications system, which is consistent with the actual and punctual requirements of the applications and with the enterprise's actual business requirements (i.e., instant requirements), thus preserving the perceived QoE for all communication services while also maximizing the exploitation of the network resources.

The invention also ensures a simple and effective management of the network+applications system, resulting in a more effective selection of the hardware/software infrastructures to be used.

The invention claimed is:
1. An apparatus for traffic management in a telecommunications network, wherein, through said telecommunications network, data are exchanged by means of at least one software application external to said apparatus, wherein said apparatus comprises:

a) a first module configured to interface with said telecommunications network and configured to acquire first traffic information, at an application level, relating to data traffic exchanged through said at least one software application operating in said telecommunications network;

b) a second module configured to interface with said telecommunications network and configured to acquire second traffic information, at a network level, relating to the data traffic exchanged through said telecommunications network; and c) a control module configured for managing resources of said telecommunications network for said data traffic and said at least one software application as a function of said first traffic information and said second traffic information.

2. The apparatus according to claim 1, wherein said control module is configured for:

a) determining a physical topology of said telecommunications network;

b) determining a logical topology of said telecommunications network for said at least one software application;

c) defining a correlation model based on said physical topology and said logical topology; and d) generating output signals for managing said applications and said network resources on the basis of said correlation model.

3. The apparatus according to claim 1, wherein said data are exchanged, in said telecommunications network, through a plurality of software applications, said control module being configured for determining said logical topology as a function of said plurality of software applications.

4. The apparatus according to claim 1, wherein said control module is configured for identifying network apparatuses belonging to said telecommunications network that connect a local network to an external network.

5. The apparatus according to claim 2, wherein said telecommunications network is managed via Software Defined Network or SDN technology.

6. The apparatus according to claim 1, wherein said data traffic occurs via TCP/IP technology.

7. The apparatus according to claim 1, wherein said software application is associated with a respective Unified Communication and Collaboration or UC&C system.

8. A method for traffic management in a telecommunications network, wherein, through said telecommunications network, data are exchanged by means of at least one software application, said traffic management being carried out an apparatus for traffic management, said at least one software application being external to said apparatus for traffic management, wherein said method comprises:

a) acquiring first traffic information by the apparatus for traffic management, at application level, relating to the data traffic exchanged through said at least one software application, wherein the apparatus for traffic management is configured to interface with the telecommunications network;

b) acquiring second traffic information by the apparatus for traffic management, at network level, relating to the data traffic exchanged through said telecommunications network;

c) managing resources of said telecommunications network for said data traffic and said at least one software application as a function of said first information and said second information, and in relation to the "enterprise business logics" that are active at any given time.

9. A non-transitory computer readable storage medium, storing one or more programs comprising instructions that, when executed by one or more processors, result in the implementation of the method according to claim 8.

* * * * *